Feb. 19, 1963 F. JAMNIK ETAL 3,077,755
APPARATUS FOR FORMING PROFILED GLASS SHEETS
Filed June 1, 1959 2 Sheets-Sheet 1

Inventors:
Fridolin Jamnik
Adolf Pelzl
by: Michael S. Striker
Attorney

United States Patent Office 3,077,755
Patented Feb. 19, 1963

3,077,755
APPARATUS FOR FORMING PROFILED GLASS SHEETS
Fridolin Jamnik and Adolf Pelzl, Vienna, Austria, assignors to Moosbrunner Glasfabrik A.G., Vienna, Austria
Filed June 1, 1959, Ser. No. 817,190
Claims priority, application Austria June 4, 1958
4 Claims. (Cl. 65—253)

The present invention relates to apparatus for continuously manufacturing glass sheet material.

In apparatus of this type the greatest difficulty is encountered in providing a glass sheet of accurate width. The reason for this difficulty resides in the fact that in conventional apparatus provided for this purpose the glass while still in plastic condition tends to adhere to parts of the apparatus so that the width of the sheet cannot be uniformly maintained. Serious disadvantages result from the lack of uniformity in the width of the sheet material manufactured with the conventional apparatus. For example, when the sheet is passed through certain devices undesirably large stresses and strains are produced at the widest portions of the sheet often resulting in breakage or other failure. Moreover, when it is desired to reinforce the sheet as by embedding wire reinforcing elements therein, such reinforcing elements cannot be distributed over the entire width of the sheet and because of the lack of uniform width, and it is necessary to distribute the reinforcements over a width no greater than the narrowest part of the sheet, so that the wider portions of the sheet must be manually cutoff which results in sharp edges giving rise to further difficulties because of the ease with which such sharp edges chip.

It is therefore a primary object of the present invention to provide a glass forming apparatus with a structure which will reliably produce a glass sheet of predetermined width.

It is also an object of the present invention to provide an apparatus of the above type which will reliably prevent any adhering of the glass material to the structure which forms the sheet.

It is also an object of the present invention to control the temperature of the structure which forms the glass sheet in such a way that cooling of the glass sheet itself, particularly at the edges thereof, is avoided so that there is no tendency for crystallization to take place at the edges of the glass sheet during the formation thereof.

It is also an object of the present invention to provide a structure which is capable of being easily and quickly adapted to the production of glass sheets of any desired width.

With the above objects in view the present invention includes in apparatus for continuously manufacturing glass sheet material of predetermined width, a pair of sheet-forming rolls parallel to each other and vertically spaced from each other so as to determine the thickness of the sheet formed between the rolls by the distance therebetween, a glass material in plastic condition being adapted to flow through the space between the latter rolls so as to be formed into a sheet by these rolls. A means, according to the present invention, cooperates with the end faces of one of these rolls to prevent the glass material located in the space between the rolls from flowing beyond the ends of this one roll so as to determine the width of the sheet formed between the rolls. Also, in accordance with the present invention, the rolls themselves as well as the structure for limiting the width of the sheet are formed so that their temperature can be controlled and thus any adhering of the glass material to the sheet-forming structure can be avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
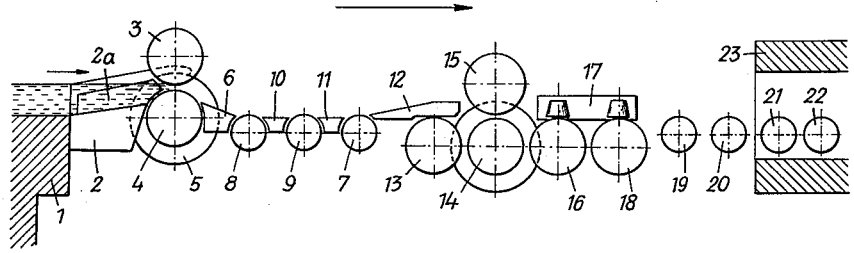
FIG. 1 is a schematic side elevational view of an apparatus which includes the structure of the present invention.
Figure 2:
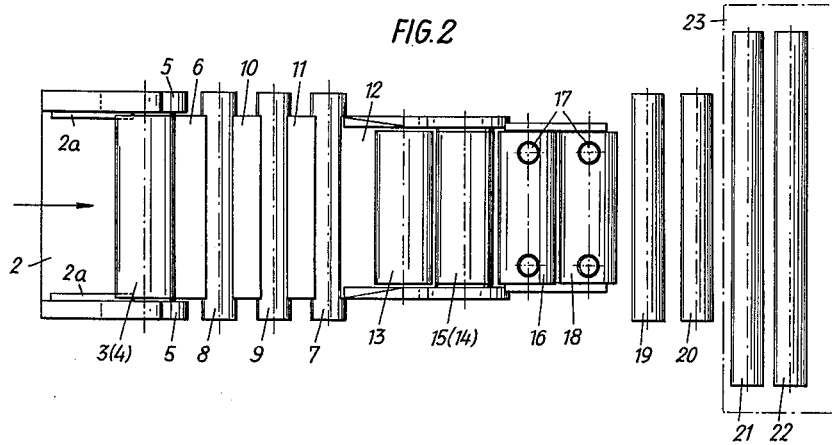
FIG. 2 is a top plan view, also schematic, of the structure of FIG. 1.

Referring now to FIGS. 1 and 2, it will be seen that the glass material is located in molten condition in a suitable container and flows out of the latter over the element 1 which forms part of the discharge structure of the container which contains the glass in molten condition. The glass flows from the element 1 between elements 2 and 2a and from the latter the glass, which is in plastic condition at this time, enters into the space between a pair of rolls 3 and 4 which in part form the subject matter of the present invention. The distance between the rolls 3 and 4 will determine the thickness of the glass sheet formed by the structure of the invention, the rolls 3 and 4 forming the sheet-forming rolls of the invention.

In order to determine the width of the sheet which is formed between the rolls 3 and 4, there is provided in accordance with the present invention a means which cooperates with the end faces of the roll 3 for preventing the plastic glass material from flowing beyond the ends of the roll 3. Thus, with this construction, the rolls 3 and 4 limit the sheet vertically while the means which cooperates with the end faces of the roll 3 limit the sheet horizontally so that the sheet which is formed with the structure of the invention passes through a space which is limited on all sides. As is shown in FIGS. 1 and 2, this limiting means takes the form of a pair of flanges 5 respectively carried by the ends of the roll 4 and slidably engaging the end faces of the roll 3 so as to prevent the glass material from flowing beyond the end faces of the roll 3, and thus the flanges 5 will reliably determine the width of the sheet which is formed between the rolls 3.

As is schematically illustrated in FIGS. 1 and 2, the structure of the invention forms part of an apparatus which includes, in addition, the sheet transporting rolls 7, 8, 9 for transporting the sheet to an apparatus which will give the sheet the desired configuration, the roll bridges 6, 10 and 11 being respectively positioned between the pairs of successive rolls, as illustrated in FIGS. 1 and 2. The parts 12—18 form a structure for giving the glass sheet a desired profile, in a well known manner not forming part of the present invention, and the transporting rolls 19 and 20 receive the glass from the device 12—18 and transport it along the interior of a cooling chamber 23 which is provided with additional rolls 21 and 22 for continuing the transportation of the glass.

Figure 3:
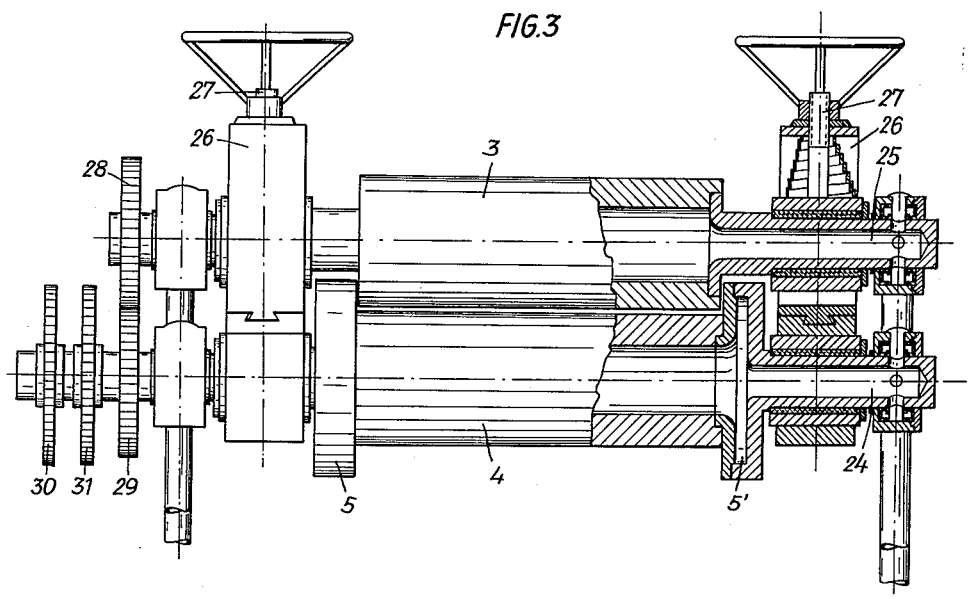
FIG. 3 is an enlarged transverse view, partly in section, of the structure of the present invention.

The structure of the invention is shown in detail in FIG. 3 from which it becomes apparent that the rolls 3 and 4 are hollow and that the flanges 5 and 5' which are fixed to the ends of the roll 4 for rotation therewith are also hollow. The flange 5' shown at the right end of the hollow roll 4 is fixed to an elongated hollow shaft 24 while the right end of roll 3 is fixed to an elongated hollow shaft 25. These hollow shaft portions 24 and 25 are respectively turnably supported by bearing blocks 26 which can be adjusted in their height by the screw means 27 which is manually turnable for the purpose of adjusting the elevation of the rolls.

The rolls 3 and 4 also are connected with elongated hollow shafts extending to the left from the rolls 3 and 4, as viewed in FIG. 3, through a bearing structure 26 having an adjusted device 27 identical with the devices 26 and 27 shown at the right of FIG. 3, and the elongated hollow shafts which extend to the left from the rolls 3 and 4 are respectively fixed with a pair of meshing gears 28 and 29 which constrain the rolls to rotate in opposite directions in proper synchronism so as to simultaneously form and transport a sheet. The gears 30 and 31 which are fixed to the shaft which extends from the roll 4 serve to transmit the drive to the rolls.

As is apparent from the right end of FIG. 3, the hollow shafts 24 and 25 are formed with bores passing through the wall thereof near the ends of the shafts 24 and 25, and these ends of the shafts 24 and 25 are received in hollow fluid-tight enclosures which respectively communicate with tubular conduits shown at the right of FIG. 3. Also, the hollow shafts which are fixed to and extend to the left from the roll 3 and the flange 5 of FIG. 3 are formed with bores passing through the walls thereof and located within the fluid-tight enclosures shown in FIG. 3 just to the right of the gears 28 and 29, the shafts being freely turnable with respect to these enclosures, and in addition a pair of tubular conduits are shown in FIG. 3 and respectively communicating with the interiors of the enclosures shown in FIG. 3 just to the right of the gears 28 and 29. Thus, with this construction it is possible to circulate throughout the interior of the rolls 3 and 4 as well as the hollow flanges 5 and 5' a suitable fluid such as steam, for example, maintained at a temperature which will prevent the glass material from clinging or adhering in any way to the rolls 3 and 4 or the flanges 5 and 5', so that efficient sliding of the glass sheet material through and beyond the space between the rolls 3 and 4 and between the flanges 5 and 5' is guaranteed so that a glass sheet of predetermined thickness and width will be formed in a very reliable manner with the structure of the invention.

It should be noted that the temperature controlling structure provided by the hollow construction of the rolls 3 and 4 and the flanges 5 and 5' and the conduit means for conveying a temperature controlling fluid therethrough will produce the desired results whereas, for example, a structure for blowing a stream of cooling air on the glass material itself will not produce the desired result, since such a structure will lead to localized premature crystallization of the glass material particularly at the edges thereof so that it does not become possible to maintain the glass material in plastic condition as long as desired. Thus, the inner surface portions of the hollow rolls and flanges as well as the conduits communicating with the hollow interiors of the rolls and flanges provide heating means cooperating on the one hand with the rolls themselves and on the other hand with the flanges to heat the glass at its opposed faces by the rolls and at its side edges by the flanges, which form a limiting means preventing the glass from flowing beyond the ends of the roll 3.

As may be seen from FIG. 3, it is possible to slip the right hollow enclosures of FIG. 3 off from the shafts 23 and 25 and then to move the right bearing structure 26 off from the shafts 24 and 25. Thereafter, upon disconnection of the gears 28 and 29 from the left ends of the shafts which are fixed to the rolls 3 and 4, these gears being fixed to the latter by set arrows or the like, for example, it is possible simply to slip the illustrated rolls 3 and 4 out of position and to replace them with another pair of rolls of different length, for example, and also including the flanges 5 and 5' of the invention cooperating with the rolls in the manner illustrated in FIG. 3, so that thereafter after replacing the right bearing structure 26 and the conduit structure which communicates with the hollow interiors of the rolls and flanges, it becomes possible to produce a sheet of different dimensions. Thus, the structure of the invention includes a support means which supports the rolls 3 and 4 for interchangeability with different rolls 3 and 4 with different dimensions when it is desired to produce a sheet of a different size.

It will be understood that each of the elements described above, or two or more together, may also find a useful application in other types of apparatus for continuously performing glass sheets differing from the types described above.

While the invention has been illustrated and described as embodied in an apparatus for continuously forming glass sheets of predetermined width, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

The rolling apparatus described hereinbefore may be used, e.g., under the following conditions:

Glass Composition

| | Percent |
|---|---|
| $SiO_2$ | 68–72 |
| $Na_2O$ | 14–16 |
| $CaO$ | 8–12 |
| $MgO$ | 1–3 |
| $Al_2O_3$ | 1–3 |

(1) To produce unreinforced glass ribbons the incoming crude glass ribbon must have a temperature of 1100° C. before the rolls 3—4 and a temperature of 1050° C. after the rolls 3—4. The rolling speed $v$ is 1.8–2 meters per minute.

(2) To produce reinforced glass ribbons the temperature of the incoming crude glass must be 1200° C. before the rolls 3—4 and 1100° C. after the rolls 3—4. The rolling speed $v$ is 2.2–2.4 meters per minute.

What is claimed as new and desired to be secured by Letters Patent is:

1. In an apparatus for continuously manufacturing glass sheet material of predetermined width, in combination, a pair of parallel horizontal sheet-forming rolls spaced vertically with respect to each other to form from glass in plastic condition flowing between said rolls a sheet of predetermined thickness; limiting means cooperating with the ends of at least one of said rolls for preventing the glass from flowing beyond the ends of said one roll so as to determine the width of the sheet formed between said rolls; and heating means cooperating directly with said rolls and directly with said limiting means for heating the glass at its opposed faces engaged by said rolls as well as at its side edges engaged by said limiting means.

2. In an apparatus for continuously manufacturing glass sheet material of predetermined width, in combination, a pair of parallel horizontal sheet-forming rolls spaced vertically with respect to each other to form from glass in plastic condition flowing between said rolls a sheet of predetermined thickness; limiting means cooperating with the ends of at least one of said rolls for preventing the glass from flowing beyond the ends of said one roll so as to determine the width of the sheet formed between said rolls, said limiting means being in the form of a pair of limiting members respectively slidably engaging the ends of said one roll and respectively located in a pair of parallel planes which are normal to the axis of said one roll; and heating means cooperating directly with both of said rolls and directly with both of said limiting members for heating said rolls and limiting members so as to heat the glass at its opposed faces engaged by said rolls as well as at its side edges engaged by said limiting members.

3. In an apparatus for continuously manufacturing glass sheets of predetermined width, in combination, a pair of horizontal parallel sheet-forming rolls spaced vertically with respect to each other to form from glass in plastic condition flowing through the space between said rolls a sheet whose thickness is determined by the distance between said rolls, one of said rolls fixedly carrying a pair of flanges which slidably engage the end faces, respectively, of the other of said rolls so that said flanges prevent the glass material from flowing beyond the ends of said other roll and thus determine the width of the sheet; and heating means cooperating directly with both of said rolls and directly with both of said flanges for heating said rolls and flanges so as to heat the glass at its opposed faces engaged by said rolls as well as at its side edges engaged by said flanges.

4. In an apparatus for continuously manufacturing glass sheet material of predetermined width, in combination, a pair of elongated hollow parallel sheet-forming rolls vertically spaced from each other at a distance which determines the thickness of a sheet of glass formed by movement of glass in plastic condition through the space between said rolls; a pair of hollow flanges fixed to one of said rolls for rotation therewith and engaging the end faces of the other of said rolls for preventing the glass material from flowing beyond the ends of said other rolls so as to determine the thickness of the sheet formed by the glass material flowing between said rolls; and means communicating with the hollow interiors of said rolls and with the hollow interior of said flanges for circulating through said rolls and flanges a heating fluid.

References Cited in the file of this patent

UNITED STATES PATENTS

| | | |
|---|---|---|
| 305,716 | Schulze-Berge | Sept. 23, 1884 |
| 706,550 | Gollins | Aug. 12, 1902 |
| 1,564,240 | Hitchcock | Dec. 8, 1925 |
| 1,772,072 | Drake | Aug. 5, 1930 |
| 1,783,465 | Fox | Dec. 2, 1930 |